United States Patent [19]
Thornton

[11] Patent Number: 4,792,877
[45] Date of Patent: Dec. 20, 1988

[54] ELECTRIC MOTOR ARMATURE CURRENT CONTROL CIRCUIT

[75] Inventor: Dennis P. Thornton, Centervile, Ohio

[73] Assignee: General Motors Corporation, Detroit, Mich.

[21] Appl. No.: 180,670

[22] Filed: Mar. 31, 1988

Related U.S. Application Data

[63] Continuation of Ser. No. 086,019, Aug. 17, 1987, abandoned.

[51] Int. Cl.$^4$ .............................................. H02H 7/08
[52] U.S. Cl. ........................................ 361/24; 361/27; 361/58; 361/103; 318/783; 318/334; 318/473
[58] Field of Search ........................ 361/18, 24, 25, 27, 361/31, 58, 100, 103, 106; 318/783, 782, 434, 430, 473, 471, 334; 337/105, 104, 107; 307/117

[56] References Cited

U.S. PATENT DOCUMENTS

| | | | |
|---|---|---|---|
| 3,673,538 | 6/1972 | Faxon | 338/25 |
| 3,886,401 | 5/1975 | Berg | 315/94 |
| 3,914,727 | 10/1975 | Fabricius | 361/24 |
| 3,916,264 | 10/1975 | Berg | 361/106 |
| 4,408,244 | 10/1983 | Weible | 361/24 |
| 4,716,486 | 12/1987 | Sobiepanek et al. | 361/24 |

FOREIGN PATENT DOCUMENTS 654304 12/1962 Canada .................................. 361/27

Primary Examiner—A. D. Pellinen
Assistant Examiner—Todd E. DeBoer
Attorney, Agent, or Firm—Robert M. Sigler

[57] ABSTRACT

An electric motor armature current control circuit includes an electric motor with an armature in series with a protective device comprising a pair of polymer PTC elements connected in electrical series with the motor armature windings and in electrical parallel and thermal contact with each other. The first polymer PTC element, a temperature compensating element, has a very low cold resistance and a trip temperature higher than the maximum expected ambient temperature to which it is to be exposed in motor operation and generates heat in motor operation to trip to a much higher resistance and become self-regulating at that trip temperature. The second polymer PTC element is maintained at least at the trip temperature of the first through thermal contact and has a lower resistance at that temperature than the cold resistance of the first. Its trip temperature is higher so as to be reached only with excessive armature current. Due to the temperature compensation element, the protective device limits excessive armature winding current after a period of time independent of ambient temperature.

4 Claims, 1 Drawing Sheet

ELECTRIC MOTOR ARMATURE CURRENT CONTROL CIRCUIT

This is a continuation of application Ser. No. 086,019, filed Aug. 17, 1987 now abandoned.

BACKGROUND OF THE INVENTION

This invention relates to the limitation of excessive armature current in a wound armature electric motor and particularly to such limitation by polymer PTC elements placed in series with the motor armature to carry the armature current. Such polymer PTC material has a resistance below a trip temperature sufficiently low as to not significantly affect the armature current, the resistance rising sharply and greatly above the trip temperature.

Polymer PTC materials, which may have a cold resistance on the order of 0.5 ohm or less and a very sharp resistance change at the trip temperature, are more suitable than other PTC materials such as barium titanate for use directly in series with a motor armature, since they have a comparatively low voltage drop and power dissipation. The material is heated directly by the armature current therethrough and trips when the heat generated by the armature current causes the temperature thereof to increase to the trip temperature. However, since the trip temperature is essentially constant, the trip time for an excessive armature current depends on the starting temperature of the PTC material. Such starting temperature is generally the ambient temperature, which may vary greatly in some environments such as motor vehicles.

The trip time following the onset of an excessive armature current must be short enough at low ambient temperatures to allow an increase in resistance in time to protect the motor. However, the trip time at high ambient temperatures must be sufficiently long to prevent nuisance tripping on short transient overcurrents that are not damaging to the motor. The problem is illustrated in FIG. 3, which shows the variation of resistance over time for a single typical prior art polymer PTC element carrying an excessive motor armature current. It can be seen that the trip time is highly variable inversely with ambient temperature. It is desirable to reduce this variability.

SUMMARY OF THE INVENTION

The invention is an electric motor armature current control circuit comprising an electric motor having a field and an armature with armature windings, an electric power supply, and a motor protection device connected in series with the motor armature windings and electric power supply, whereby an armature winding current also flows through the motor protection device. The motor protection device comprises pair of polymer PTC elements connected in electrical series with the motor armature windings and in electrical parallel and thermal contact with each other.

The first polymer PTC element has a resistance effective to generate heat with armature winding current flow therethrough and a first trip temperature higher than the maximum expected ambient temperature to which the first polymer PTC element is to be exposed in motor operation. Above the first trip temperature its resistance increases greatly from a low resistance essentially negligible in its effect on the armature winding current to a high resistance. The heat generated by normal armature current is effective to raise the temperature of the first polymer PTC element above the first trip temperature; and the resulting high resistance is effective to reduce electric current therethrough sufficiently as to make the first polymer PTC element self regulating at the first trip temperature.

The second polymer PTC element is maintained by the first through thermal contact at least at the first trip temperature. The second polymer PTC element has a resistance effective to generate heat with armature winding current flow therethrough and a second trip temperature sufficiently higher than the first to require excessive armature winding current to raise the temperature thereof to the second trip temperature. Above the second trip temperature the resistance of the second polymer PTC element increases greatly from a low resistance lower than that of the first polymer PTC element and essentially negligible in its effect on the armature winding current to a high resistance protectively limiting the armature winding current. The first polymer PTC element also has, at the second trip temperature, a high resistance protectively limiting the armature winding current. Therefore, the protective device limits excessive armature winding current after a period of time independent of ambient temperature.

DESCRIPTION OF THE PREFERRED EMBODIMENT

Figure 1:
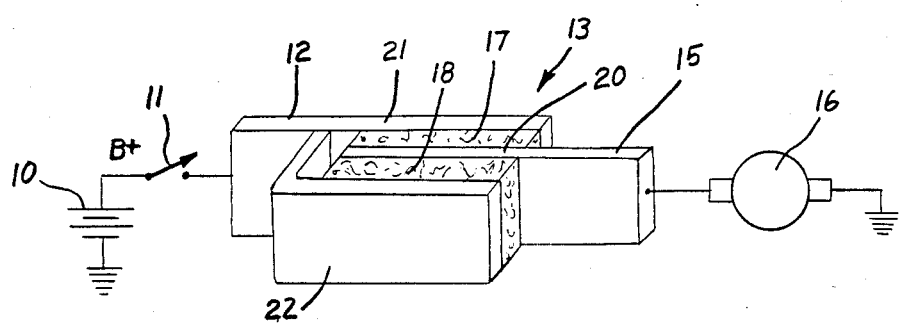
FIG. 1 is a combined perspective view and circuit diagram of a preferred embodiment of this invention, which view shows a controlled motor armature circuit with a protective device and the structure of the protective device.

Referring to FIG. 1, a source of DC electric power is represented as battery 10, which has one terminal grounded and another at supply voltage B+ connected through a switch 11 to a terminal 12 of a protection device 13. Protection device 13 has another terminal 15 connected in series with the armature of a DC, permanent magnet motor 16 to ground. Thus, when switch 11 is closed, armature current flows from battery 10 through protection device 13 in series with the armature of motor 16.

Protection device 13 comprises two polymer PTC elements 17 and 18, each having a different trip temperature between low and high resistances. The low resistance of each is a value essentially negligible to affect the armature current of motor 16, such as 0.5 ohm or less. This resistance is almost constant up to the trip temperature, above which it increases greatly to a value such as fifty ohms or more, which is effective to limit the armature current of motor 16 for its protection.

Elements 17 and 18 are both in electrical and thermal contact with an extension 20 of terminal 15. Element 17 is in electrical contact with an extension 21 of terminal 12; and element 18 is in electrical contact with an electrically conducting member 22 connected to terminal 12. Extensions 21 and 22 extend from terminal 12 in a Y configuration parallel to each other and to extension 20 of terminal 15 extending thereinto from the open end of the Y. Extension 20 is sandwiched between elements 17 and 18, with the combination thereof sandwiched between extensions 21 and 22. Thus, elements 17 and 18 are connected electrically in parallel with each other and in series with terminals 12 and 15. In addition, elements 17 and 18 are in thermal contact, over a wide area through extension 20, so that heat from one raises the temperature of the other.

Polymer PTC element 17, the ambient temperature compensating element, has a cold resistance below a trip temperature which is effective with armature current flowing therethrough to generate heat to raise its temperature to the trip temperature, at which the resistance greatly increases to a higher resistance effective to render the element self regulating at the trip temperature. The trip temperature is set just above the maximum expected ambient temperature to which device 13 is to be exposed. When switch 11 is first closed, a current flows through element 17 to heat it quickly to its trip temperature, which may be, for example, 85 degrees C. The heat generated by element 17 also raises the temperature of element 18, since the two are in thermal contact. When element 17 trips, its resistance increases greatly, which reduces its power dissipation. From this point on, it operates as a self regulating temperature maintenance element for element 18.

Polymer PTC element 18 also has a resistance which generates heat; but it trips at a temperature higher than does element 17 by an amount sufficient to require excessive armature current to raise the temperature thereof to its trip temperature. A convenient trip temperature for element 18 is 135 degrees C. Its resistance below its trip temperature is lower than that of element 17 and is essentially negligible in its effect on the armature current of motor 16; but, when it trips, its resistance increases greatly to a level sufficient to protectively limit the armature current of motor 16.

After element 17 warms up to its trip temperature of 85 degrees C., it maintains element 18 at this temperature until a condition develops which causes an excessive current flow through motor 16 and device 13. Most of this current flow will be through element 18, since the resistance of element 17, greater than that of element 18 when cold, has increased still further. Since element 18 essentially always starts from the same temperature, regardless of ambient temperature, it always takes approximately the same time to trip; and this time is controllable through the design parameters of device 13. The excessive current may be a fault current such as results from a short circuit, but it does not have to be. Some motors are designed for short term, intermittent use with an armature current that does no damage in such use but may burn the motor out in longer term, continuous operation. In the latter case, the excessive current is present as soon as the switch is closed; and the fault condition is operation of the motor continuously for too long a period. Device 13 will protect against either type of fault.

Figure 2:
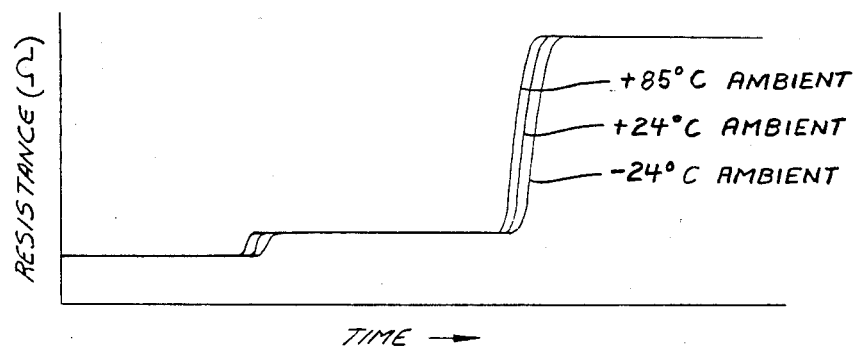
FIG. 2 is a curve of electrical resistance vs. time for the embodiment of FIG. 1.
Figure 3:
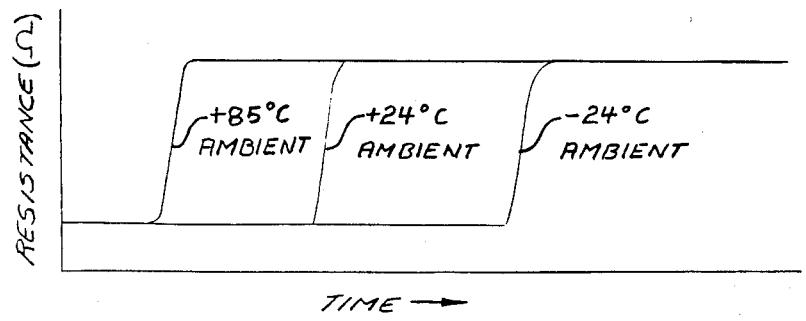
FIG. 3 is a curve of electrical resistance vs. time for a prior art arrangement of a single polymer PTC element showing a high variability of trip time inversely with ambient temperature.

The effect of the temperature compensating element 17 can be seen by comparing FIG. 2, resistance vs. time with the element, to FIG. 3, resistance. vs. time without it. The time and resistance scales of the Figures are not necessarily identical: the Figures indicate the general behavior of the devices. In FIG. 3, the time from initial excessive current to trip temperature is shown for three ambient temperatures: +85° C., +24° C. and −24° C. The trip time may be identified as the portion of the curve where the resistance increases greatly, which portion is labeled with the ambient temperature. The time is seen to vary greatly, inversely with ambient temperature. FIG. 2 shows the times for the same ambient temperatures for the invention. Due to the fact that the temperature compensating element causes the device to start from approximately the same temperature regardless of ambient temperature, the time difference is greatly reduced.

The embodiments of the invention in which an exclusive property or privilege is claimed are defined as follows:

1. An electric motor armature current control circuit comprising, in combination:

an electric motor having a field and an armature with armature windings;

an electric power supply;

a motor protection device connected in series with the motor armature windings and electric power supply, whereby any armature winding current also flows through the motor protection device, the motor protection device comprising (a) a first polymer PTC element connected in electrical series with the motor armature windings, the first polymer PTC element having a resistance effective to generate heat with armature winding current flow therethrough and characterized by a first trip temperature higher than the maximum expected ambient temperature to which the first polymer PTC element is to be exposed in motor operation, above said first trip temperature said resistance increases greatly from a low resistance to a high resistance, the heat generated by normal armature current being effective to raise the tempeature of said element above the first trip temperature and the resulting high resistance being effective to reduce electric current therethrough sufficiently as to make the first polymer PTC element self regulating at the first trip temperature, and (b) a second polymer PTC element connected in electrical parallel with said first element and in thermal contact therewith for being maintained at least at the first trip temperature, the second polymer PTC element having a resistance effective to generate heat with armature winding current flow therethrough and characterized by a second trip temperature sufficiently higher than said first trip temperature and requiring an excessive armature winding current to raise the temperature of said second element to the second trip temperature, and above said second trip temperature said second element resistance increases greatly from a low resistance lower than that of the first polymer PTC element and essentially negligible in its effect on the armature winding current to a high resistance protectively limiting the armature winding current, the first polymer PTC element also having, at the second trip temperature, a high resistance protectively limiting the armature winding current, whereby the protective device limits excessive armature winding current after a period of time independent of ambient temperature.

2. The electric motor armature current control circuit of claim 1 in which the first and second trip temperatures are substantially 85 and 135 degrees C., respectively.

3. The electric motor armature current control circuit of claim 1 in which the motor protection device has a pair of terminals for connection in series with the motor armature windings, one of said terminals has an extension extending between the polymer PTC elements for electrical connection to one side of each and thermal connection to both and the other of said terminals has parallel extensions in a Y configuration to the other side of each polymer PTC element with the extension of said one of said terminals extending parallel between the parallel extensions of said other of said terminals and polymer PTC elements so as to connect the polymer PTC elements in electrical parallel between the terminals.

4. The electric motor armature current control circuit of claim 3 in which the first and second trip temperatures are substantially 85 and 135 degrees C., respectively.

* * * * *